(12) United States Patent
Chou et al.

(10) Patent No.: US 7,711,118 B2
(45) Date of Patent: May 4, 2010

(54) SECURITY SYSTEM

(75) Inventors: Yuh-Fwu Chou, Hsinchu County (TW);
Hsin-Hsien Yeh, Taichung (TW);
Mo-Hua Yang, Hsinchu County (TW);
Horng-Yuan Wen, Taoyuan County
(TW); Jing-Pin Pan, Hsinchu Hsien
(TW); Ying-Chang Hung, Hsinchu
County (TW)

(73) Assignee: Industrial Technology Research Institute, Hsinchu (TW)

( * ) Notice: Subject to any disclaimer, the term of this patent is extended or adjusted under 35 U.S.C. 154(b) by 1131 days.

(21) Appl. No.: 11/318,571

(22) Filed: Dec. 28, 2005

(65) Prior Publication Data

US 2007/0147615 A1    Jun. 28, 2007

(51) Int. Cl.
*H04K 1/00* (2006.01)
(52) U.S. Cl. .................................... 380/270
(58) Field of Classification Search ............... 380/270
See application file for complete search history.

(56) References Cited

U.S. PATENT DOCUMENTS

| 2004/0160319 A1* | 8/2004 | Joao ..................... 340/539.1 |
| 2005/0170818 A1* | 8/2005 | Netanel et al. ............. 455/415 |
| 2006/0100983 A1* | 5/2006 | Atkinson et al. .............. 707/1 |

* cited by examiner

*Primary Examiner*—Kambiz Zand
*Assistant Examiner*—Stephen Sanders
(74) *Attorney, Agent, or Firm*—Birch, Stewart, Kolasch & Birch, LLP

(57) ABSTRACT

The security system for a protected object comprises a first wireless module, a central controller, and a remote authorization server. The first wireless module and the central controller are disposed in the protected object. The first wireless module transmits an authorization request with an authorization ID (identification) of the protected object, and receives an authorization response. The central controller is coupled to the first wireless module, and allows the protected object to operate in accordance with the authorization response. The remote authorization server, responsive to the authorization request, generates the authorization response from an authorization record thereof in accordance with the authorization ID, and transmits the authorization response.

19 Claims, 8 Drawing Sheets

SECURITY SYSTEM

BACKGROUND OF THE INVENTION

1. Field of the Invention

The invention relates to security systems, and more specifically to a security system obtaining authorization of a protected object with a wireless module.

2. Description of the Related Art

Conventionally, people deposit their valuables in a specific place such as home, offices, and safe deposit boxes to keep the valuables from theft, or use locking devices or chains to fix valuables. However, theft attempts can damage the locking devices or chains. With improvement in technology, authentication devices, such as fingerprint authentication devices, chip locks and RFID (radio frequency identification) devices, built into technical products such as mobiles, PCs, digital cameras identify users. However, complicated authentication device are more susceptible to malfunction. Thus, solutions are usually prepared in case the authentication devices do not work properly, increasing risk of theft.

BRIEF SUMMARY OF THE INVENTION

A detailed description is given in the following embodiments with reference to the accompanying drawings.

An exemplary embodiment of a security system comprises a first wireless module, a central controller, and a remote authorization server. The first wireless module and the central controller are disposed in a protected object. The first wireless module transmits an authorization request with an authorization ID (identification) of the protected object, and receives an authorization response. The central controller is coupled to the first wireless module, and allows the protected object to operate in accordance with the authorization response. The remote authorization server, responsive to the authorization request, generates the authorization response from an authorization record thereof in accordance with the authorization ID, and transmits the authorization response.

A vehicle security system is further provided, comprising a wireless module, a central controller, a transceiver, and a remote authorization server. The wireless module and the central controller are disposed in the vehicle. The wireless module transmits an authorization request with an authorization ID (identification) of the vehicle, and receives an authorization response. The central controller, coupled to the first wireless module, allows the protected object to operate in accordance with the authorization response. The transceiver receives the authorization request from the first wireless module and transmits the authorization response thereto. The remote authorization server, connected to the transceiver via a network, responsive to the authorization request from the transceiver, generates the authorization response from an authorization record thereof in accordance with the authorization ID, and transmits the authorization response to the transceiver.

A security method is also provided, comprising transmitting an authorization request with an authorization ID (identification) of a protected object, generating an authorization response from an authorization record in accordance with the authorization ID, and allowing the protected object to operate in accordance with the authorization response.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
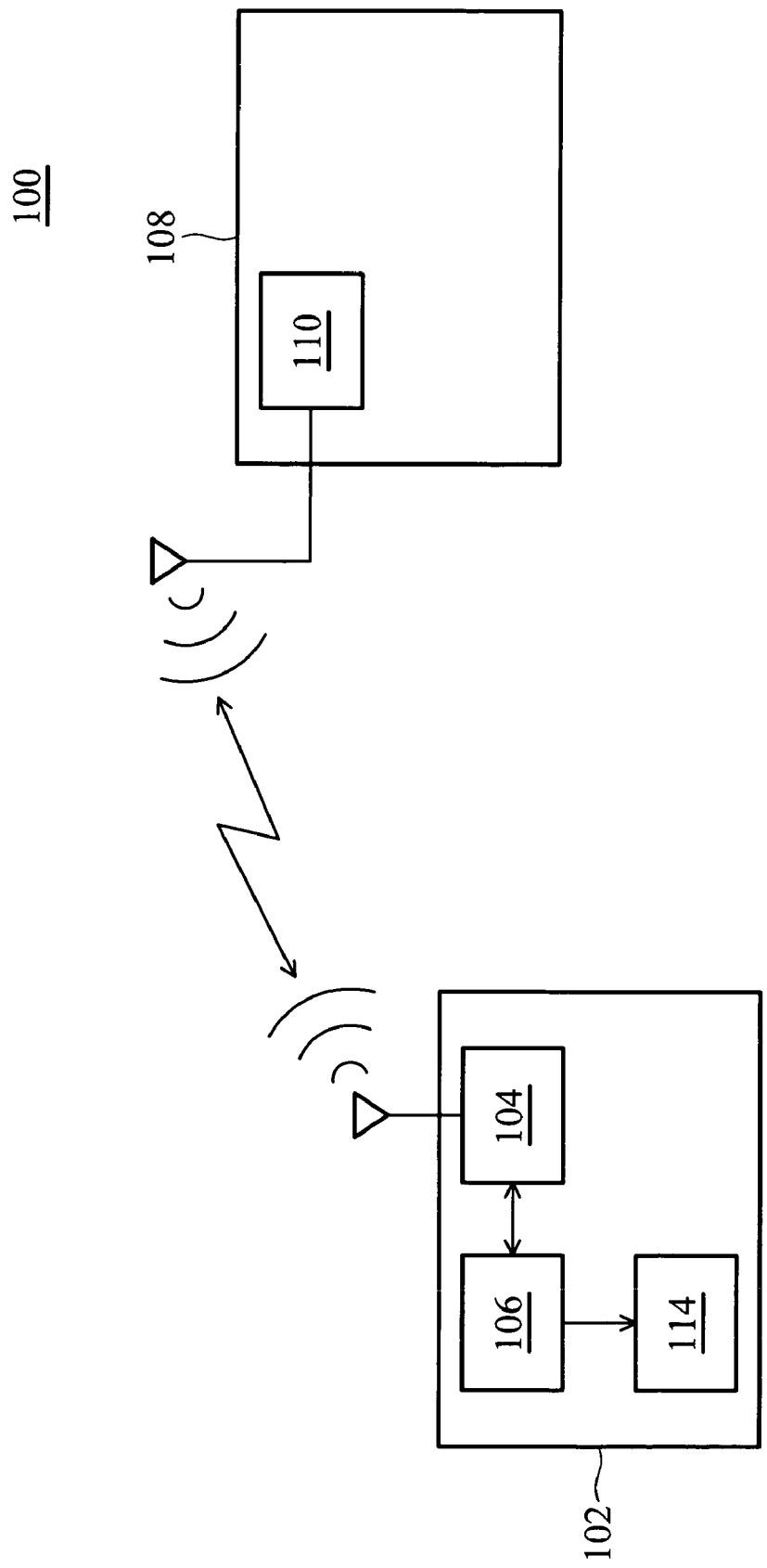
FIG. 1 is a block diagram of a security system according to an embodiment of the invention.
Figure 2:
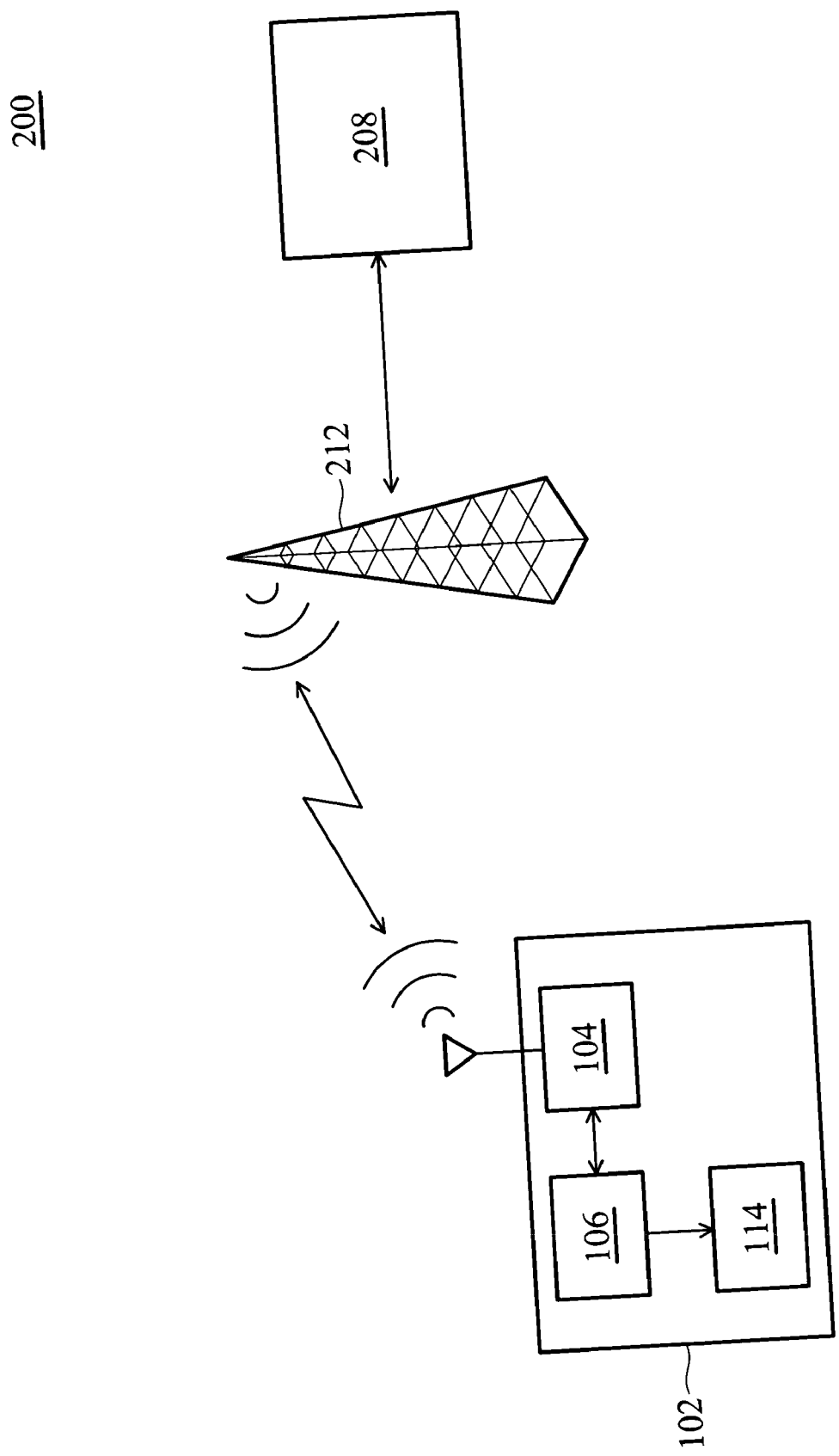
FIG. 2 is a block diagram of a security system according to another embodiment of the invention.

FIG. 1 shows a security system 100 for an object 102 according to an embodiment of the invention, comprising a wireless module 104, a central controller 106, and a remote authorization server 108. Both the wireless module 104 and central controller 106 are disposed in the protected object 102, such as a vehicle or a mobile phone. The wireless module 104 which may be a GPRS (General Package Radio Service) module, a 3G (third generation cellular system) module, a WiFi module, or a Bluetooth module transmits an authorization request with an authorization ID (identification) of the protected object 102 to the remote authorization server 108, and receives an authorization response therefrom. The remote authorization server 108, responsive to the authorization request, generates the authorization response from an authorization record thereof in accordance with the authorization ID, and transmits the authorization response. The central controller 106 is coupled to the wireless module 104 and allows the protected object 102 to operate in accordance with the received authorization response from the wireless module 104. The authorization response comprises an authorization password and a valid period, wherein the central controller 106 checks whether the authorization password is valid when receiving the authorization response from the wireless module 104. If so, the central controller 106 allows the protected object 102 to operate normally which includes powering the protected object 102 up for the valid period of the authorization response, indicating the validity period of the authorization response. Hence, before the valid period ends, the wireless module 104 re-transmits another authorization request with the authorization ID of the protected object 102 again and receives a corresponding authorization response. The wireless module 104 may transmit the authorization request periodically before a predetermined period prior to the expiration of the current authorization response until receiving an authorization response with a valid authorization password, extending the valid period thereof. Thus, if the protected object 102 is stolen, a user can change the authorization record contained in the remote authorization server 108 with respect to the authorization ID of the protected object 102 and when the wireless module 104 requires another authorization response from the remote authorization server 108, the protected object 102 will not work properly with an invalid authorization password or a zero valid period. Thus, the protected object 102 is protected from theft. The security system 100 further comprises an alarm device 114, generating a warning signal such as light or sound, near the end of the valid period. To establish the connection between the wireless module 104 and remote authorization server 108, the remote authorization server 108 comprises a wireless module 110 receiving the authorization request from the wireless module 104 and transmitting the authorization response thereto. FIG. 2 shows a security system 200 according to another embodiment of the invention. FIG. 2 uses the same numerals as FIG. 1 which perform the same function, and thus are not described in further detail. FIG. 2 is similar to FIG. 1 except that the security system 200 further comprises a transceiver 212 and the remote authorization server 208 does not necessarily comprise a wireless module. In this case, the wireless module 104 transmits the authorization request to the transceiver 212 connected to the remote authorization server 208 via a network, redirecting the authorization request to the remote authorization server 208. The remote authorization server 208 then transmits the authorization response generated by the remote authorization server 208 to the transceiver 212, thereby redirecting the authorization response to the wireless module 104. The invention can be utilized in various applications as follows.

First Embodiment

Figure 3:
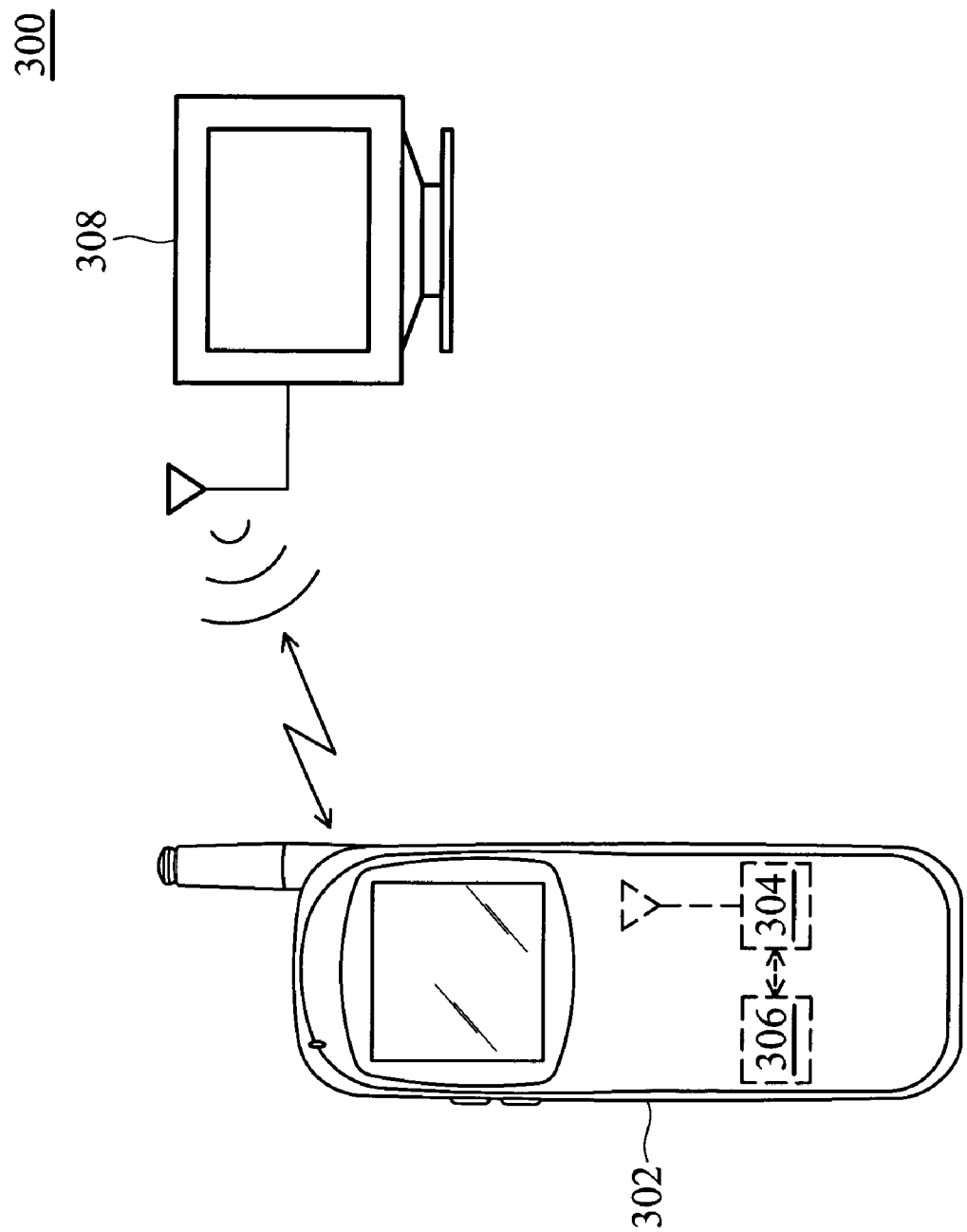
FIG. 3 is a block diagram of a security system according to the first embodiment of the invention.

FIG. 3 shows a security system 300 according to a first embodiment of the invention, applied to a mobile phone 302. The mobile phone is given an authorization ID during manufacture, provided to the owner, enabling ration in an authorization record of a remote authorization server 308 in a GSM network. When the mobile phone 302 is powered on, a central controller 306 therein transmits an authorization request with the authorization ID by a wireless module 304 of the mobile phone 302 to the remote authorization server 308. Upon receiving the authorization request, the remote authorization server 308 generates an authorization response from the authorization record thereof in accordance with the authorization ID of the mobile phone 302, and transmits the authorization response back to the wireless module 304 of the mobile phone 302. The central controller 306 of the mobile phone 302 checks the content of the authorization response, determining if an authorization password thereof is valid. If so, the mobile phone 302 is operable for a valid period directed in the authorization response, for example, 6 hours. Thus, if the mobile phone 302 is lost, the authorization record in the remote authorization server 308 can be changed. Without a valid authorization password, the mobile phone 302 is inoperable.

Second Embodiment

Figure 4:
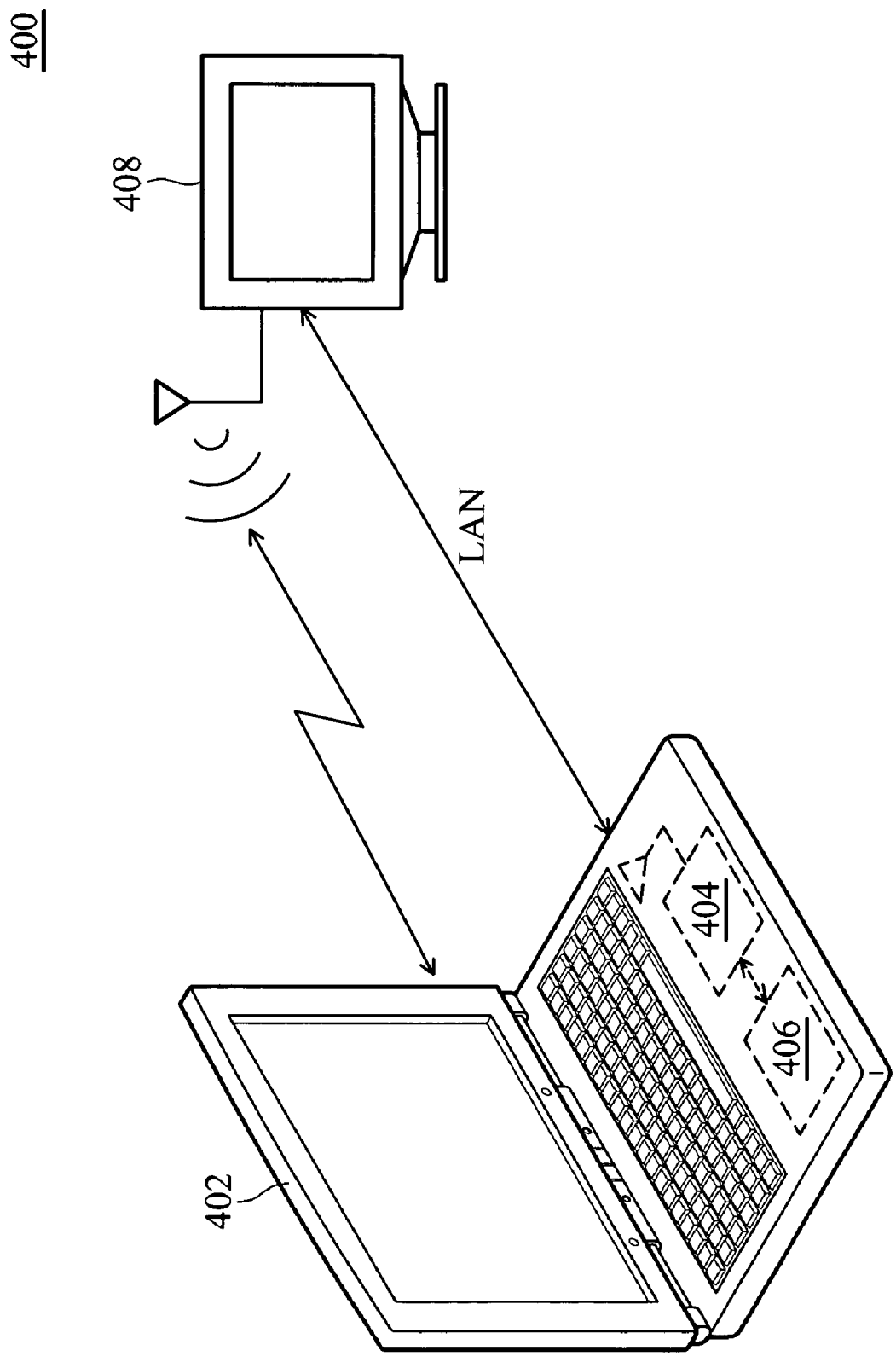
FIG. 4 is a block diagram of a security system according to the second embodiment of the invention.

FIG. 4 shows a security system 400 according to a second embodiment of the invention, applied to a personal computer (PC) 402. A remote authorization server 408 is connected to a LAN wherein an authorization record of the remote authorization server 408 contains authorizations with respect to IDs for each PCs in the LAN environment. Operations with a keyboard of the PC 402 triggers a wireless module 406 of the PC 402 to transmit an authorization request with the authorization ID of the PC 402 to the remote authorization server 408, which generates an authorization response from the authorization record thereof in accordance with the authorization ID of the PC 402, and transmits the authorization response back to the wireless module 404 of the PC 402. A central controller 406 of the PC 402 checks the content of the authorization response, determining if an authorization password thereof is valid. If so, the operation with the keyboard is permitted for a valid period contained in the authorization response, for example, 200 hours. If the PC 402 is stolen, it is only operable for 200 hours. The function of the central controller 406 is implemented by a program stored in the BIOS (Basic Input/Output System) of the PC 402 so that an authorization is required in an operation with the keyboard of the PC 402, wherein an authorization status record is stored in a Non-Volatile Random Access Memory (NVRAM) of the PC 402. The authorization status record comprises information of the most recent authorization request including a valid period of the last successful authorization comprising date and time thereof. Moreover, the NVRAM of the PC 402 comprises a flag indicating if the most recent authorization request is still valid according to the valid period thereof wherein the flag is set up by an internal time interrupt subprogram of the system of the PC 402 with periodic comparison of current time and valid date and time of the most recent successful authorization response. Thus, in an operation with the keyboard of the PC 402 via the BIOS, the BIOS checks the flag, determining if the authorization response is still valid. If so, the operation with keyboard is permitted, otherwise, the BIOS directs the wireless module 404 to send an authorization request in order to obtain a corresponding authorization response, allowing the operation with keyboard. Furthermore, to ensure that normal operations of the PC 402 are not affected by communication problems, the wireless module 404 may transmit an authorization request periodically by a sub program, for example every one hour before a predetermined period, such as 100 hours, prior to the end of the valid period until obtaining an authorization response having longer valid period than the previous valid period. It is noted that the PC 402 may be a desktop or a laptop; however, since the laptop is mobile, the remote authorization server 408 is able to receive an authorization request transmitted via external network, enabling portability of the PC 402. Moreover, if the laptop PC 402 is stolen, location thereof is determined by its authorization request when previous authorization response expires. Even if location of the PC 402 is not obtained by sending an authorization request, the PC 402 renders inoperable after the authorization response expires.

Third Embodiment

Figure 5:
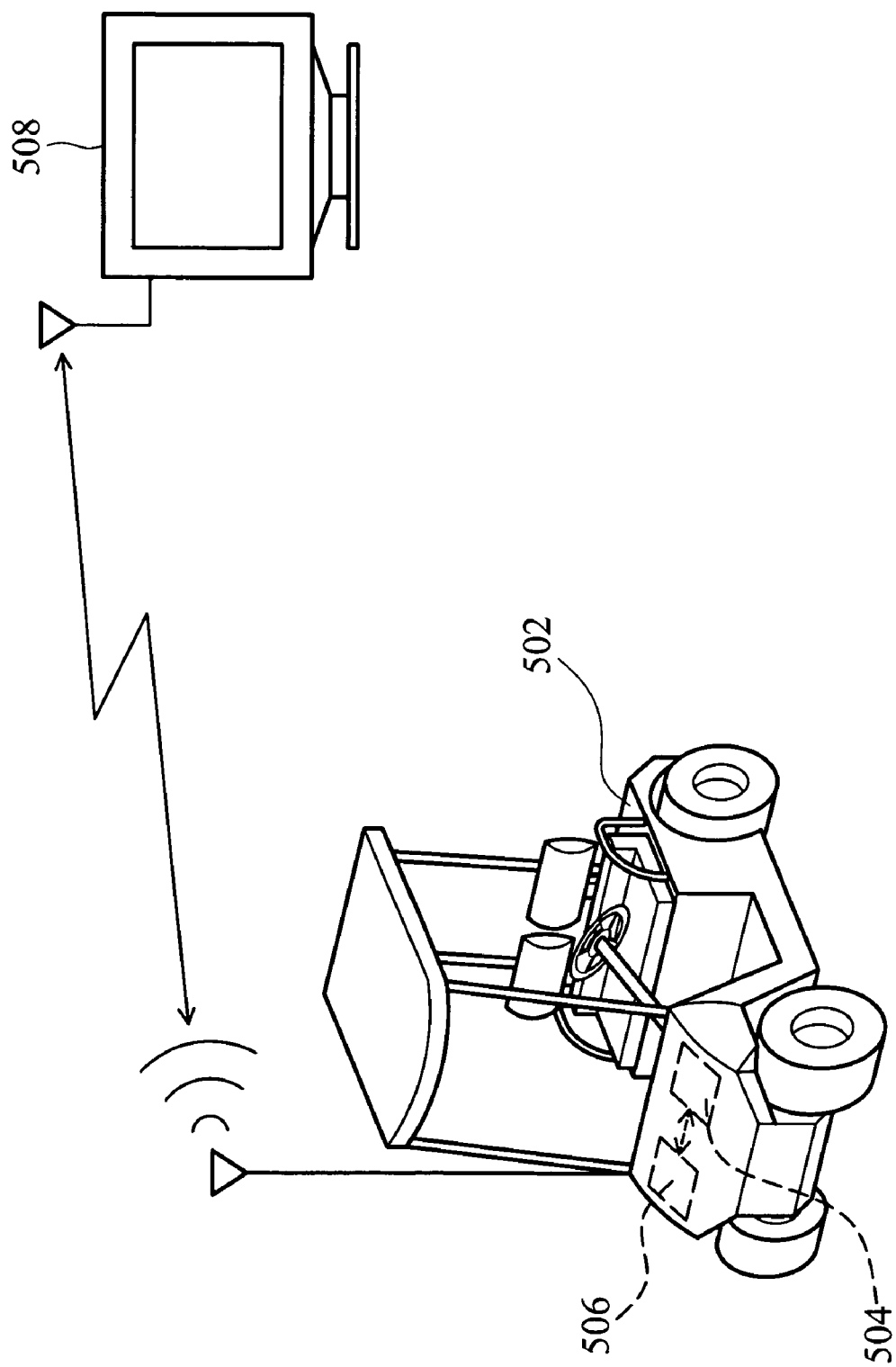
FIG. 5 is a block diagram of a security system according to the third embodiment of the invention.

FIG. 5 shows a security system 500 according to a third embodiment of the invention, applied an electric vehicle 502, such as a golf cart. When the battery of the electric vehicle 502 provides power thereto, a wireless module 504 thereof, such as an infrared module, transmits an authorization request with an authorization ID of the electric vehicle 502 to the remote authorization server 508 to obtain an authorization response therefrom after the remote authorization server 508 checks an authorization record thereof in accordance with the authorization ID of the electric vehicle 502. A central controller 506 of the electric vehicle 502, such as a microprocessor, checks the content of the authorization response, determining if an authorization password thereof is valid and enables the powering of the electric vehicle 502 accordingly. If the authorization password is valid, the central controller 506 permits power to the electric vehicle 50 for a valid period contained in the authorization response. Before the authorization response expires, the electric vehicle 502 must obtain another authorization response to continue operability. The remote authorization server 508 is set up in a central control center, such that operability of the electric vehicle 502 is ensured only as long as the electric vehicle 502 is returned within the valid period to the central control center. If the electric vehicle 502 is stolen, power supply is interrupted by the central controller 506 after the valid period. Moreover, the electric vehicle 502 must be in the central control center to obtain an authorization request, simplifying fleet management.

Fourth Embodiment

Figure 6:
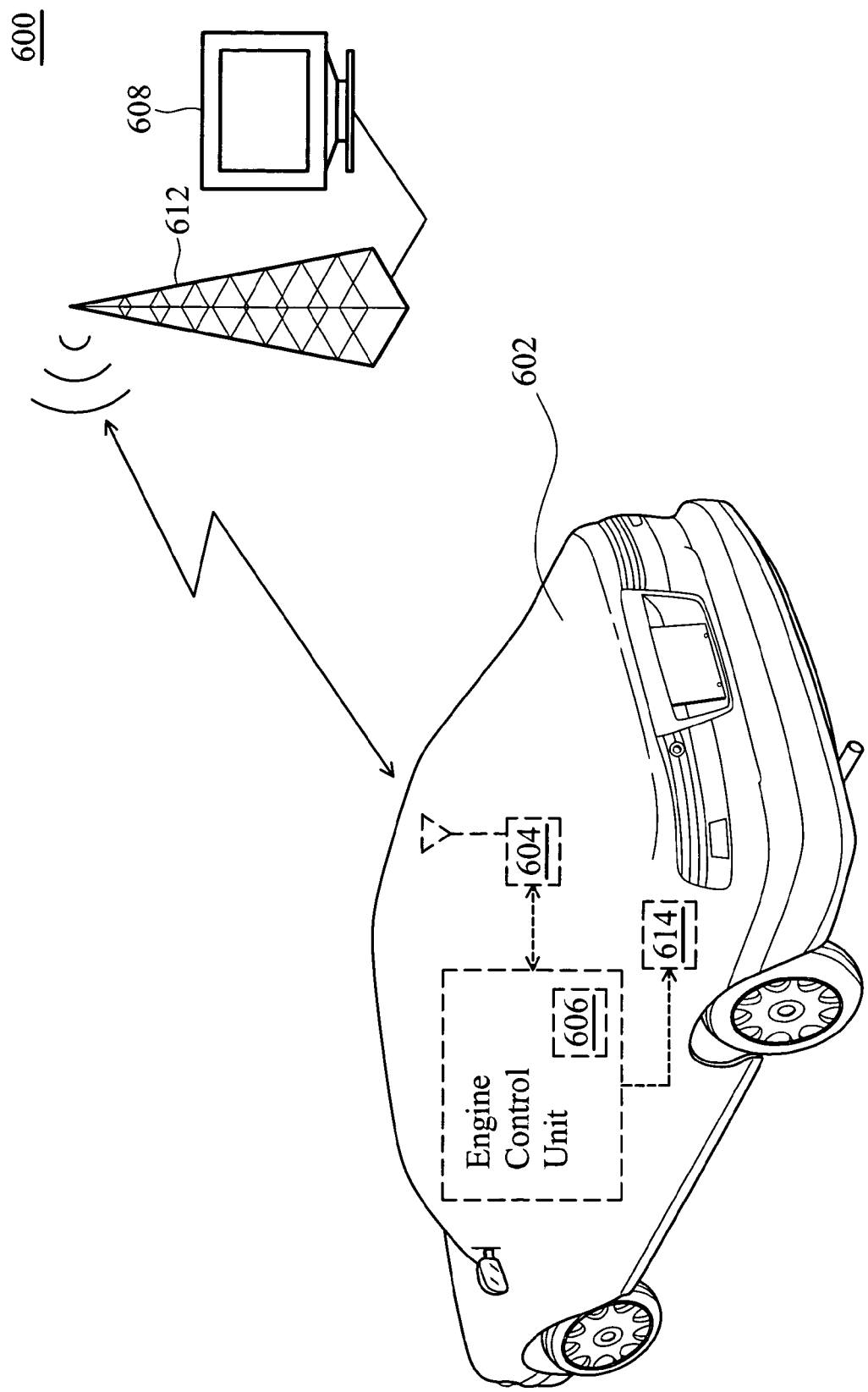
FIG. 6 is a block diagram of a security system according to the fourth embodiment of the invention.

FIG. 6 shows a security system 600 according to a fourth embodiment of the invention, applied to a vehicle 602. In this embodiment, when powered up, a wireless module 604 of the vehicle 602 such as a GPRS system transmits an authorization request with the authorization ID of the vehicle 602 to a remote authorization server 608 via a transceiver 612. When receiving the authorization request, the remote authorization server 608 generates an authorization response from the authorization record thereof in accordance with the authorization ID of the vehicle 602, and transmits the authorization response back to the wireless module 604 of the vehicle 602 via the transceiver 612, wherein the authorization response contains an authorization password and a valid period during which the vehicle 602 is operable. A central controller 606 of the vehicle 602 checks the content of the authorization response, determining if the authorization password thereof is valid. If so, the vehicle 602 is operable for the valid period of the authorization response. It is noted that in this embodiment, the central controller is built into an engine control unit (ECU) of the vehicle 602. Thus, during the valid period of the authorization response, the ECU of the vehicle 602 provides power normally. To avoid problems resulted from the vehicle 602 being out of the coverage of the remote authorization server 608 when the valid period expires, the remote module 604 transmits an authorization request every hour for a predetermined period prior to the expiration of the authorization response until obtaining a new authorization response, extending the valid period. For example, if the valid period of the authorization response is 200 hours, the wireless module 604 may be set to transmit an authorization request each hour after 100 hours pass. Moreover, to avoid security problems when the authorization response expires, the security system 600 further comprises an alarm device 614 to generate a warning signal to the user of the vehicle 602 before the period of the authorization response ends, such as 48 hours prior to the expiration of the authorization response, reminding the user to relocate within the coverage of the remote authorization server 608, to obtain a new authorization response. Furthermore, the central controller 606 does not stop providing power to the vehicle 602 when the authorization password is invalid or the valid period ends until the vehicle 602 has stopped moving, for safety. The user of the vehicle 602 may change the authorization record of the remote authorization server 608 according to requirements. For example, if the vehicle 602 is used primarily close to the server, a shorter valid period can be set in the authorization record such as 24 hours. Conversely, a longer valid period can be set if the vehicle is used over long distances or in the field far away from the coverage of the remote authorization server 608. Moreover, the authorization request transmitted by the wireless module 604 may contain location information of the vehicle 602 obtained by a GPS (Global Positioning System) thereof such that if the vehicle 602 is stolen, the location information can be obtained and the location of the vehicle 602 can be tracked. Further, the authorization record can be changed to reduce the valid period, such that the wireless module 604 re-transmits an authorization request in a shorter interval, keeping an eye on the location of the stolen vehicle 602, thereby enabling the police to find the thief as soon as possible.

Fifth Embodiment

Figure 7:
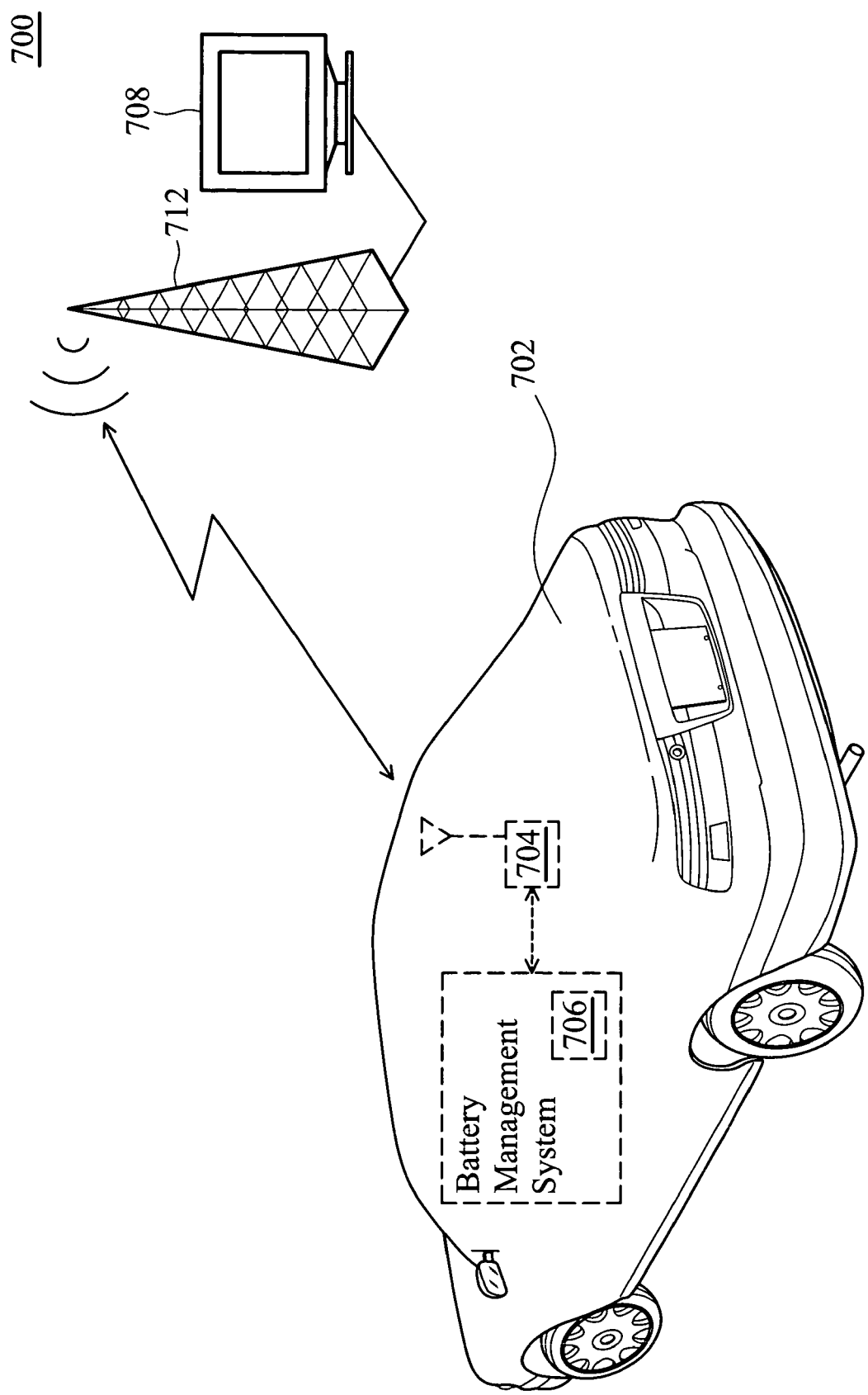
FIG. 7 is a block diagram of a security system according to the fifth embodiment of the invention.

FIG. 7 shows a security system 700 according to a fifth embodiment of the invention, applied to an electric vehicle 702. Unlike the fourth embodiment, here the central controller 706 in FIG. 7 is built into battery management system of the electric vehicle 702. The battery management system is usually incorporated into a battery module of electric vehicles, obtaining information of the battery module such as life, remaining power and so on. The central controller 706 in the battery management system of the vehicle 702 transmits an authorization request with the authorization ID of the vehicle 702 by a wireless module 704 of the vehicle 702 such as a GPRS module to obtain an authorization response with respect to the ID of the vehicle 702 from a remote authorization server 708 via a receive-transmit device 712. The central controller 706 in the battery management system controls the power output to the vehicle 702 in accordance with the authorization response. Moreover, the authorization request transmitted by the wireless module 704 may contain information of the battery module of the vehicle 702. Thus, user is notified of the need for battery maintenance. Rental agencies can further detect the charge of the electric vehicle 702 according to the battery module information. The battery module in vehicle 702 may be a fuel cell. It is noted that the security system 700 is not a replacement for conventional keys but an additional way for users to protect vehicles.

Figure 8:
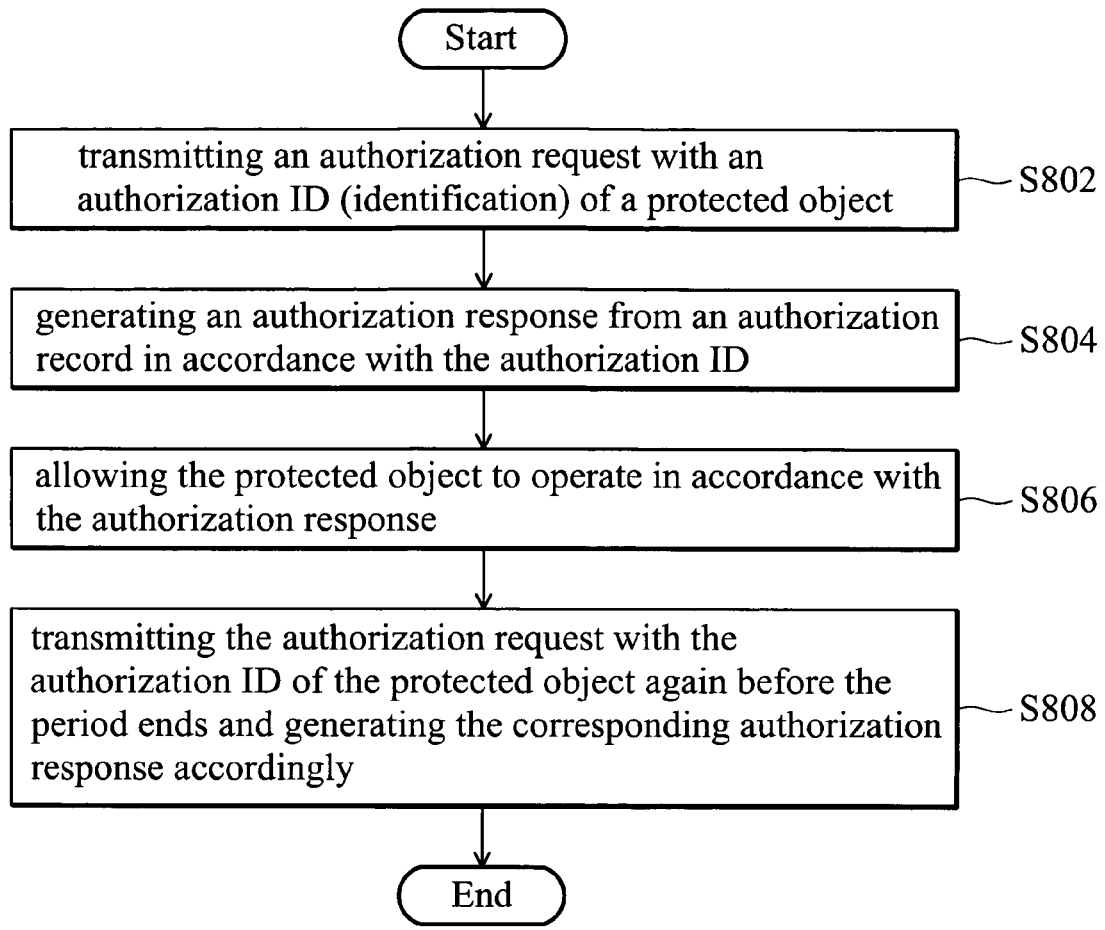
FIG. 8 is a flowchart of a security method according to another embodiment of the invention.

FIG. 8 shows a flowchart of a security method 800 according to another embodiment of the invention. In step 802, an authorization request with an authorization ID (identification) of a protected object is transmitted. In step 804, an authorization response from an authorization record in accordance with the authorization ID is generated, wherein the authorization response comprises an authorization password and a valid period. In step 806, the protected object is rendered operable in accordance with the authorization response, when the authorization password is valid. Proceeding to step 808, the authorization request with the authorization ID of the protected object is transmitted again before the period ends and the corresponding authorization response is generated accordingly. The authorization request may be transmitted periodically before the valid period ends.

With the security system of the invention, a protected object is inoperable without a proper authorization response even in the absence of the security system. Thus, indication of the presence of the security system of the invention may be attached to protected objects, such as the window thereof to deter potential theft. The security system of the invention utilizes wireless communication, reducing hardware costs in installing the security system of the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A security system for a protected object configured with an authorization ID (identification), comprising:
   a first wireless module disposed in the protected object, transmitting an authorization request with the authorization ID, and receiving an authorization response responsive to the authorization request;
   a remote authorization server, generating the authorization response with an authorization password from the authorization record thereof in accordance with the authorization ID and transmitting the authorization responses, in response to the authorization request; and
   a central controller disposed in the protected object, coupled to the first wireless module, determining whether the authorization password in the authorization response is valid, allowing the protected object to operate if the authorization password in the authorization response is valid, and disabling the protected object if the authorization password in the authorization response is not valid,
   wherein the authorization record is originally set for the remote authorization server to generate the authorization response with the authorization password being valid, when the protected object is not stolen, and the authorization record is further changed by a user so that the remote authorization server generates the authorization response with the authorization password being invalid, when the protected object is stolen.

2. The security system as claimed in claim 1, wherein the central controller renders the protected object operable if the authorization password is valid.

3. The security system as claimed in claim 1, wherein the authorization response comprises a valid period, indicating the validity period of the authorization response.

4. The security system as claimed in claim 3, wherein the first wireless module transmits the authorization request again before the valid period ends and receives the corresponding authorization response accordingly.

5. The security system as claimed in claim 4, wherein the first wireless module transmits the authorization request periodically before the valid period ends.

6. The security system as claimed in claim 3, further comprising an alarm device, generating a warning signal a predetermined period prior to the end of the valid period.

7. The security system as claimed in claim 1, wherein the remote authorization server comprises a second wireless module receiving the authorization request and transmitting the authorization response.

8. The security system as claimed in claim 1, further comprising a transceiver connected to the remote authorization server via a network, wherein the first wireless module transmits the authorization request to the remote authorization server through the transceiver and receives the authorization response therethrough.

9. The security system as claimed in claim 1, wherein the protected object is a vehicle.

10. A vehicle security system for a vehicle configured with an authorization ID (identification), comprising:
    a wireless module disposed in the vehicle, transmitting an authorization request with the authorization ID, and receiving an authorization response responsive to the authorization request;
    a transceiver, receiving the authorization request from the first wireless module and transmitting the authorization response thereto;
    a remote authorization server connected to the transceiver via a network, generating the authorization response with an authorization password from an authorization record thereof in accordance with the authorization ID and transmitting the authorization response to the transceiver, in response to the authorization request; and
    a central controller disposed in the vehicle, coupled to the first wireless module, determining whether the authorization password in the authorization response is valid, allowing the vehicle to operate if the authorization password in the authorization response is valid, and disabling the vehicle if the authorization password in the authorization response is not valid,
    wherein the authorization record is originally set for the remote authorization server to generate the authorization response with the authorization password being valid, when the vehicle is not stolen, and the authorization record is further changed by a user so that the remote authorization server generates the authorization response with the authorization password being invalid, when the vehicle is stolen.

11. The vehicle security system as claimed in claim 10, wherein the central controller renders the vehicle operable if the authorization password is valid.

12. The vehicle security system as claimed in claim 10, wherein the authorization response comprises a valid period, indicating the validity period of the authorization response.

13. The vehicle security system as claimed in claim 12, wherein the wireless module transmits the authorization request again before the valid period ends and receives the authorization response accordingly.

14. The vehicle security system as claimed in claim 13, wherein the wireless module transmits the authorization request periodically before the valid period ends.

15. The vehicle security system as claimed in claim 12, further comprising an alarm device, generating a warning signal a predetermined period prior to the end of the valid period.

16. A security method for protecting a protected object configured with an authorization ID (identification) and connected with a remote authorization server, comprising:
    transmitting, by a wireless module disposed in the protected object, an authorization request with the authorization ID;
    generating, by the remote authorization server, an authorization response with an authorization password from an authorization record in accordance with the authorization ID, in response to the authorization request;
    determining, by the protected object, whether the authorization password in the authorization response received from the remote authorization server is valid;
    allowing the protected object to operate if the authorization password in the authorization response is valid; and
    disabling the protected object if the authorization password is not valid, wherein the authorization record is originally set for the remote authorization server to generate the authorization response with the authorization password being valid, when the protected object is not stolen, and the authorization record is further changed by a user so that the remote authorization server generates the authorization response with the authorization password being invalid, when the protected object is stolen.

17. The security method as claimed in claim 16, the authorization response comprises a valid period, indicating the validity period of the authorization response.

18. The security method as claimed in claim 16, further comprising transmitting the authorization request with the authorization ID of the protected object again before the valid period ends and generating the corresponding authorization response accordingly.

19. The security method as claimed in claim 18, wherein the step of transmitting the authorization request with the authorization ID of the protected object again comprises transmitting the authorization request with the authorization ID of the protected object periodically.

* * * * *